(12) United States Patent
Eny (10) Patent No.: US 8,892,859 B1
(45) Date of Patent: Nov. 18, 2014

(54) HARDWARE BASED DETECTION OF FACTORY RESET REQUEST

(75) Inventor: Elad Eny, Azor (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 1178 days.

(21) Appl. No.: 12/652,396

(22) Filed: Jan. 5, 2010

Related U.S. Application Data

(60) Provisional application No. 61/142,504, filed on Jan. 5, 2009.

(51) Int. Cl.
*G06F 1/24* (2006.01)
*G06F 15/177* (2006.01)

(52) U.S. Cl.
USPC ......... 713/2; 713/1; 713/100; 377/82; 377/88

(58) Field of Classification Search
CPC .............. G06F 11/1417; G06F 11/165; G06F 11/0751; G06F 11/1441; G06F 2211/1097
USPC ................................ 713/1, 2, 100; 377/82, 88
See application file for complete search history.

(56) References Cited

U.S. PATENT DOCUMENTS

| | | | |
|---|---|---|---|
| 5,995,553 A * | 11/1999 | Crandall et al. | 375/272 |
| 6,438,710 B1 * | 8/2002 | Walsh et al. | 714/23 |
| 2004/0148319 A1 * | 7/2004 | Bossmeyer et al. | 708/200 |
| 2005/0044275 A1 * | 2/2005 | Adamson et al. | 709/253 |
| 2007/0162731 A1 * | 7/2007 | Toy et al. | 713/1 |
| 2008/0148035 A1 * | 6/2008 | Hsieh | 713/1 |
| 2008/0276132 A1 * | 11/2008 | Majewski et al. | 714/55 |

* cited by examiner

*Primary Examiner* — Michael J Brown (57) ABSTRACT

A hardware based detection approach for detecting a CPU reset request and a CPU boot process that resets control parameters that control operation of the CPU are described. Described embodiments of the hardware based detection approach store a count of clock cycles that elapse while a CPU reset request switch is actuated. As part of the reset process, the CPU retrieves the stored clock cycle count and based on the value of the retrieved clock cycle count, i.e., based on the duration that the CPU reset switch was physically actuated, the CPU boot process resets one or more sets of CPU control parameters to original factory settings.

19 Claims, 7 Drawing Sheets

HARDWARE BASED DETECTION OF FACTORY RESET REQUEST

INCORPORATION BY REFERENCE

This application claims the benefit of U.S. Provisional Application No. 61/142,504, "HARDWARE BASED DETECTION MECHANISM OF 'FACTORY RESET'," filed by Elad Eny on Jan. 5, 2009, which is incorporated herein by reference in its entirety.

BACKGROUND

Many end-user devices and network infrastructure equipment include a factory reset capability that is invoked to reset parameters used to control the device based on a set of generic factory settings stored in non-volatile memory. For example, a device may include a reset button, e.g., enclosed within a deep hole on the casing of the device. Pressing this button for short period of time causes the device to reset, for example clear selected registers and restart code execution. However, pressing the reset button for a longer period of time, such as for example for over 10 seconds, causes the device additionally to overwrite the current set of control parameters with a set of generic factory control parameters, in accordance with a factory reset procedure, thereby causing the device to reset based on a factory configuration.

Although simple reset instructions are communicated to a chip including a central processing unit (CPU) via a dedicated reset pin, existing factory reset capabilities are provided by software that is responsive to the reset button. Moreover, factory reset instructions typically are communicated to the chip via a general purpose input/output (GPIO) pin.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

In accordance with embodiments of the disclosure, a hardware based detection approach for detecting a CPU reset request and a CPU boot process that resets control parameters that control operation of the CPU are described. Described embodiments of the hardware based detection approach store a count of clock cycles that elapse while a CPU reset request switch is actuated. As part of the reset process, the CPU retrieves the stored clock cycle count and based on the value of the retrieved clock cycle count, i.e., based on the duration that the CPU reset switch was physically actuated, the CPU boot process resets one or more sets of CPU control parameters to original factory settings.

Described embodiments provide advantages over current general purpose input/output (GPIO) based techniques for detecting a reset request because no GPIO is required, thereby reducing GPIO requirements and/or freeing a GPIO for another use. Further, described embodiments are not dependent on host software executed by the CPU to support GPIO interrupt monitoring and/or to perform GPIO polling to detect assertion of a reset request. In addition, because the duration of a request is determined using a hardware circuit that is independent of CPU operation, a range of factory reset levels remain possible despite host software crashes. Furthermore, because the duration of a request is determined using a hardware circuit that is independent of CPU operation, a standard reset capability remains available to developers prior to the availability of host software that supports GPM polling and/ or GPIO based interrupts.

In one example embodiment, an integrated circuit device is described that includes, a central processing unit (CPU) that is configured to perform a reset operation in response to detecting that a first signal is asserted at an input pin, a counter circuit that is coupled to the input pin and that is configured to count clock cycles whenever the first signal is asserted on the input pin and to update a count value stored in a factory reset register based on the counted clock cycles, and a factory reset module that compares the stored count value to a threshold value and that causes the CPU to perform a factory reset operation that is different from the reset operation in response to the stored count value meeting or exceeding the threshold.

In a second example embodiment, a system on a chip is described that includes an integrated circuit device, the integrated circuit device including a central processing unit (CPU) that is configured to perform a reset operation in response to detecting that a first signal is asserted at a input pin of the system on chip, a counter circuit that is coupled to the input pin and that is configured to count clock cycles whenever the first signal is asserted on the input pin and to update a count value stored in a factory reset register based on the counted clock cycles, and a factory reset module that compares the stored count value to a threshold value and that causes the CPU to perform a factory reset operation that is different from the reset operation in response to the stored count value meeting or exceeding the threshold.

In a third example embodiment, a method of controlling a reset of an integrated circuit device that includes a central processing unit (CPU) is described, the method including, counting a number of clock cycles occurring when a reset request is asserted to request a CPU reset, said clock cycles being counted using a hardware circuit counter, updating a clock cycle count value in a factory reset register in response to the counted clock cycles, retrieving the clock cycle count value from the factory reset register after a CPU reset, and selectively reloading control parameters used to control operation of the electronic device based on the clock cycle count value.

In example embodiments of the integrated circuit device, and example embodiments of the system on a chip, additional features may be included. For example, the integrated circuit device can further include, a hardware counter on an integrated circuit including the CPU, the hardware counter configured to count clock cycles during which the first signal is asserted on the input pin, a power-on reset module that resets the factory reset register to zero upon first detecting that power has been supplied to the integrated circuit device, a boot sequence unit that retrieves the count value from the factory reset register during a boot process and resets one or more control parameters with a factory default value based on the retrieved count value, a mechanically actuated reset switch mechanical actuation of which asserts the first signal at the input pin, and/or an electronically actuated reset switch actuation of which by an executable instruction asserts the first signal at the input pin.

In other example embodiments of the method of controlling a reset of an electronic device that includes a central processing unit (CPU), additional features may be included. For example, the method may further include, resetting the count value stored in the factory reset register after retrieving the count value, resetting the factory reset register to zero upon first detecting that power has been supplied to the integrated circuit device, and/or selectively reloading control parameters with factory default values based on the clock cycle count value. Further, the reset request can be asserted with a mechanically actuated reset request switch and/or the reset request can be asserted with an electronically actuated reset switch.

BRIEF DESCRIPTION OF THE DRAWINGS

Example embodiments of a hardware based detection approach for detecting a CPU reset request will be described with reference to the following drawings, wherein like numerals designate like elements, and wherein.

DETAILED DESCRIPTION OF EMBODIMENTS

Figure 1:
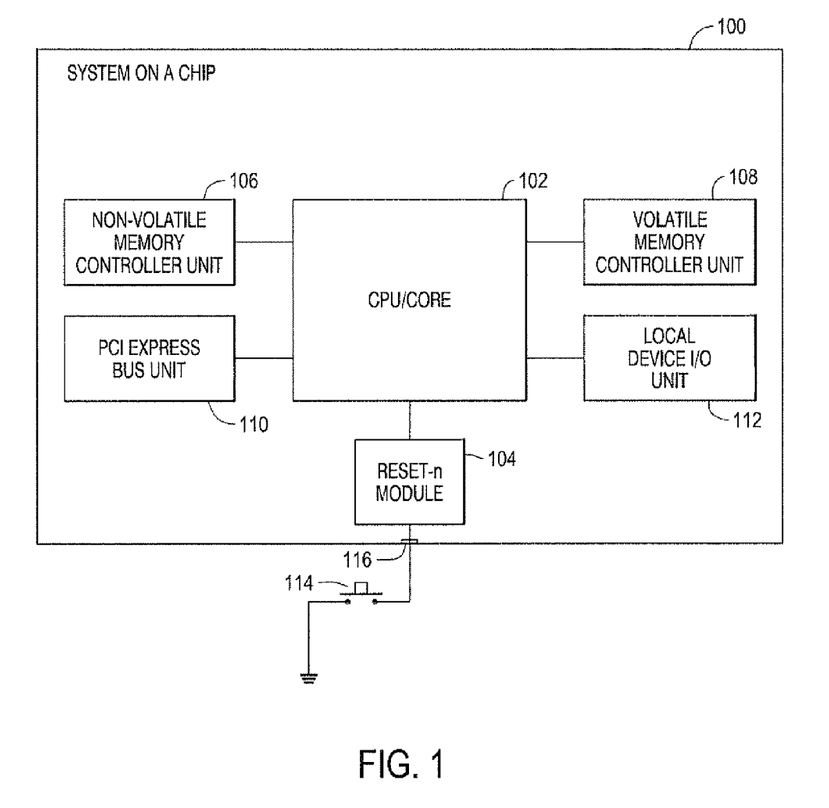
FIG. 1 is a simplified block diagram of an example system on a chip that includes a CPU and an example hardware based reset mechanism in accordance with an embodiment of the disclosure.

FIG. 1 is a simplified block diagram of an example system on a chip (SoC) that includes a CPU and an example hardware based detection mechanism for detecting CPU reset requests in accordance with an embodiment of the disclosure. In accordance with an embodiment, SoC 100 is implemented as an integrated circuit on a chip such as a silicon chip. A system on a chip based embodiment of the disclosure, as seen in FIG. 1, may be included in a wide range of end-user equipment, such as cellular phones, audio players, personal global positioning system (GPS) location devices, personal computing devices such as desktop computers, laptop computers, notebook computers, etc., network infrastructure equipment such as switches, routers, wireless access points, network attached storage devices, etc., as well as any other device that includes a CPU and that would benefit from the ability to implement a full or partial reset of CPU and/or integrated peripheral device control parameters.

In the example embodiment seen in FIG. 1, a system on a chip 100 includes a CPU/core 102 that is connected to, and communicates with a reset-n module 104, a non-volatile memory controller 106, and a volatile memory controller unit 108. SoC 100 may be configured to include some or all of the peripheral devices seen in FIG. 1, and may include additional devices that are not seen in the figure. As further seen in FIG. 1, reset-n module 104 communicates with CPU/core 102 and reset-n module 104 is electrically connected to an SoC reset pin 116. A first lead of reset request switch 114 is connected to SoC reset pin 116 and a second lead of reset request switch 114 is connected to a predetermined voltage source, e.g., a predetermined LOW voltage source.

Further, in an embodiment, system on a chip 100 includes additional units (not seen) that support functions performed by the device in which the system on a chip is included. For example, one example embodiment of system on a chip 100 further includes a PCI Express bus unit 110 that supports connectivity with SATA based peripherals, and a local device input/output unit 112 that supports interfaces with local devices as a display screen, keyboard, and pointing device. The additional support units included in system on a chip 100 may vary depending on the capabilities required by the device in which system on a chip 100 is installed. In this manner, the system on a chip approach provides device designers with the ability to efficiently produce highly reliable and capable devices in less time and with reduced development costs.

In accordance with an embodiment, CPU/core 102 maintains a set of static and/or dynamically updated control parameters that are used to control operation of the device in which the system on a chip 100 is included based on process flows embodied in executable instructions stored as either firmware and/or software and executed by CPU/core 102. For example, in accordance with an embodiment, at startup, CPU/core 102 transfers software and an initial set of related control parameters from non-volatile memory, via non-volatile memory controller unit 106, to volatile memory, via volatile memory unit 108, as part of a boot process. CPU/core 102 then controls operation of the device based on the execution of the firmware/software executable instructions configured with the related control parameters. In the example embodiment seen in FIG. 1, a reset request is asserted by actuating request switch 114 to form a CLOSED connection between reset-n module 104 and a predetermined LOW voltage level. As described with respect to FIG. 2, below, reset-n module 104 provides a pass-through interface that passes the asserted reset request to CPU/core 102, resulting in an immediate reset, or boot, of CPU/core 102. During the reset/boot process, control parameters stored in volatile memory, e.g., accessible to CPU/core 102 via volatile memory controller unit 108, being used to control operation of CPU/core 102 and related support units, are cleared and control parameters and executable code are reloaded from non-volatile memory, e.g., accessible to CPU/core 102 via non-volatile memory controller unit 106. In this manner, a device is cleared of code and/or data that has been corrupted, and is reset with an uncorrupted set of user specified values previously stored in non-volatile memory, or a set of factory default values previously stored in non-volatile memory at the factory. The control parameters and/or executable code loaded from non-volatile memory are selectively reloaded with user provided values or with original factory setting values, based on the duration that reset request switch 114 is actuated, as described in greater detail below.

In accordance with an embodiment, non-volatile memory controller unit 106 communicates with one or more types of non-volatile memory such as read-only memory (ROM), programmable read-only memory (PROM), erasable programmable read only memory (EPROM), electrically erasable programmable read-only memory (EEPROM), and/or flash memory that is used to store original factory provided control parameters and executable instructions that survive a device power-down. The non-volatile memory devices are suitably located on or off the SoC 100. In example embodiments, non-volatile memory additionally supports the storage of user defined control parameters and/or user defined executable code that are loaded in place of or and/or in addition to the factory provided control parameters and/or executable instructions, as described in greater detail below. The control parameters and/or executable code loaded from non-volatile memory to volatile memory, by CPU/core 102 via non-volatile memory controller unit 106 and volatile memory controller unit 108, are selectively reloaded based on the duration that reset-n module 104 is actuated, as described in greater detail below.

In accordance with an embodiment, volatile memory controller unit 108 communicates with one or more types of volatile memory such as dynamic random access memory (DRAM) and static random access memory (SRAM) that is used to store executable instructions and control parameters for execution. The volatile memory devices are suitably located on or off the SoC 100. In one example embodiment, CPU/core 102 retrieves executable instructions and control parameters from non-volatile memory, e.g., via non-volatile memory controller unit 106, and stores the retrieved executable instructions and control parameters in volatile memory, e.g., via volatile memory controller unit 108, for use in controlling operation of the CPU/core 102 and support modules. The control parameters and/or executable code stored in volatile memory are selectively reloaded via a user initiated reset request with user provided values and/or factory settings based on the duration that reset request switch 114 is actuated, as described in greater detail below.

In accordance with an embodiment, reset-n module 104 operates separately from CPU/core 102 and is not affected by a CPU/core 102 reset. Reset-n module 104 includes a counter circuit and a non-volatile register, that are implemented in hardware and that are disposed on the same chip on which SoC 100 is disposed. The counter circuit and register work together to determine a duration of a user initiated reset request via reset request switch 114. In one example embodiment, reset-n module 104 is activated, i.e., starts counting device clock cycles, when reset request switch 114 is actuated, e.g., by a user physically depressing a reset button or closing a physical switch, and is de-actuated, i.e., stops counting, when a user physically releases reset request switch 114 and reset request switch 114. A count value that corresponds to the number of clock cycles, which occur while reset request switch 114 is actuated, is stored in the non-volatile register until CPU/core 102 resets the non-volatile register to zero. This allows CPU/core 102 to retrieve the reset request count during the CPU/core reset process and to selectively load control parameters and/or executable code based on the value of the reset request count, as described in greater detail below.

Figure 2:
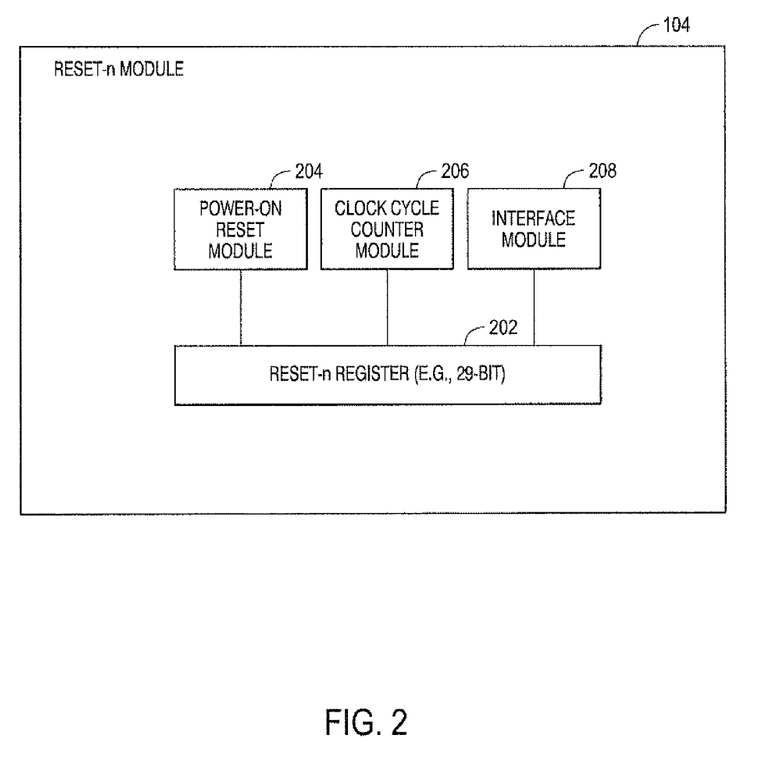
FIG. 2 is a block diagram of the example reset-n module of FIG. 1.
Figure 3:
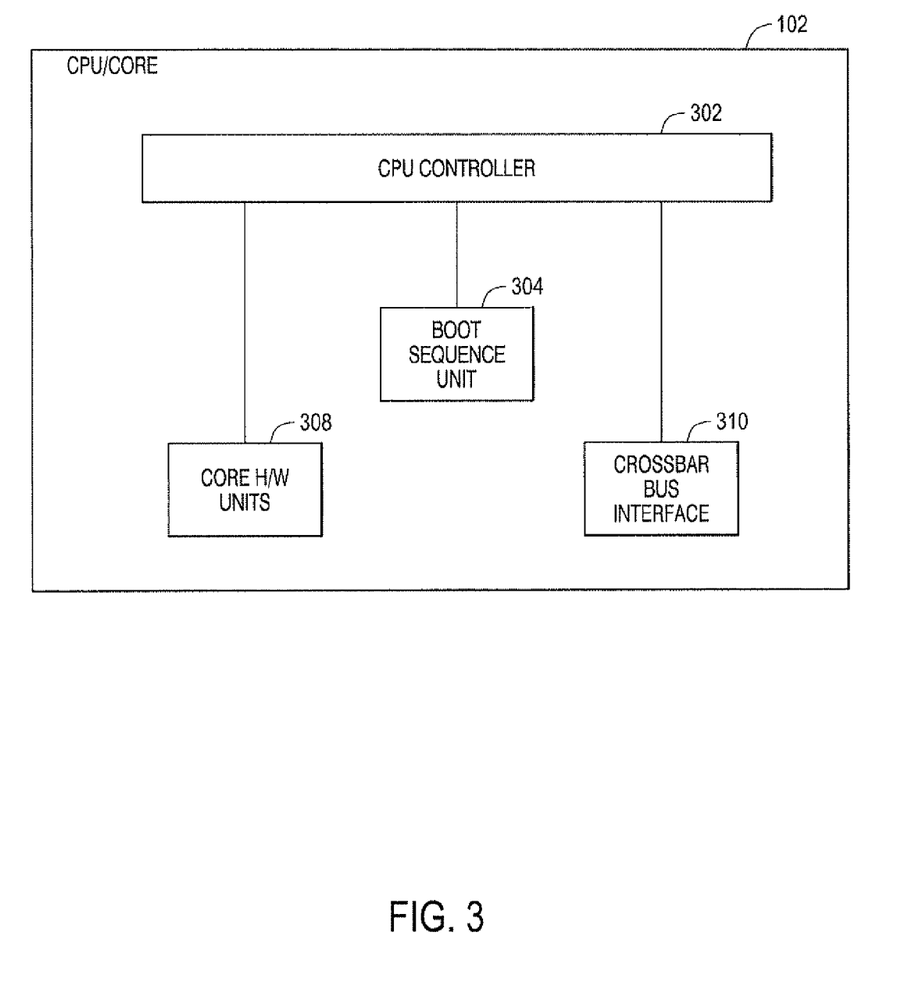
FIG. 3 is a block diagram of the example CPU/core of FIG. 1.

FIG. 2 is a block diagram of a reset-n module 104 of FIG. 1, in accordance with an embodiment of the disclosure. As seen in FIG. 2, an example embodiment of reset-n module 104 includes a non-volatile reset-n register 202, or factory reset register, which stores a reset request duration count value, i.e., a count of clock cycles that elapse during a period of time that reset request switch 114 is actuated, as described above with respect to FIG. 1, a power-on reset module 204, a clock cycle counter module 206 and an interface module 208 that includes circuitry and one or more control lines by which reset-n module 104 communicates with the CPU/core 102, as described above with respect to FIG. 1.

In accordance with an embodiment, reset-n register 202 is a 29-bit register non-volatile memory register that is incremented by 1 for each elapsed clock cycle during which reset request switch 114 is actuated. Assuming the clock monitored by clock cycle counter module 206 is a 25 MHz clock, a maximum count in reset-n register 202 corresponds to reset request switch 114 being actuated for 21.4 seconds. In other embodiments, a larger reset-n register 202 size is used to allow a longer maximum count to be stored. For example, the 21.4 second maximum is doubled with each additional bit added to reset-n register 202.

In accordance with an embodiment, power-on reset module 204 resets reset-n register 202, e.g., to a count of zero, each time power is restored to the device in which reset-n module 104 is installed. For example, in a battery-powered device, reset-n register 202 is reset each time the battery providing power to the device is removed and then re-attached. In a device with a power cord, reset-n register 202 is reset each time the cord is disconnected from the power source and then reconnected. In one example embodiment, power-on reset module 204 monitors a voltage Vdd, and resets reset-n register 202 when Vdd is first detected.

In accordance with an embodiment, clock cycle counter module 206 increments a reset request duration count stored in reset-n register 202 for each clock cycle, e.g., of a monitored system clock or other clock, during a period in which reset request switch 114 is actuated. For example, in accordance with an embodiment of the disclosure, clock cycle counter module 206 is a hardware circuit that is only activated when reset request switch 114 is actuated. When activated, clock cycle counter module 206 increments the value of the reset request count stored in reset-n register 202 on each clock cycle of a monitored clock.

In accordance with an embodiment, interface module 208 includes circuitry and connections to one or more control lines by which reset-n module 104 communicates with CPU/core 102, as described above with respect to FIG. 1. In such an embodiment, interface module 208 includes a pass-through interface that informs CPU/core 102, e.g., in response to a user actuating reset request switch 114, that a reset request has been asserted by setting a voltage level on a CPU/core reset control line connected between CPU/core 102 and reset-n module 104 to a predetermined voltage level that initiates a reset of CPU/core 102, Further, in such an embodiment, interface module 208 connects to one or more control lines that allow CPU/core 102 to retrieve the reset request duration count value stored in reset-n register 202 and allow CPU/core 102 to reset the reset request duration count stored in reset-n register 202 to zero, in preparation for use of reset-n register 202 to monitor the duration of the next reset request via reset request switch 114. For example, as described above, CPU/core 102 initiates a reset of CPU/core 102 as soon as the predetermined voltage level is detected on the CPU/core reset control line, however, reset-n module 104 is not affected by the CPU reset, and continues to increment a reset request duration count that corresponds to the duration for which the request switch 114 is CLOSED. As described in greater detail below, the boot sequence implemented by CPU/core 102 as part of the reset process, retrieves the reset request duration count from reset-n register 202, and uses the value of the reset request duration count to select which control parameters and/or executable instructions to load from non-volatile memory 106 to volatile memory unit 108 for use in controlling the startup and subsequent operation of CPU/core 102 and the device in which CPU/core 102 is installed. In one example embodiment, as described in greater detail with respect to FIG. 6, if the value of the reset request duration count is less that a predetermined threshold a standard reset is performed in which control parameters are reset with non-factory default values stored in non-volatile memory. However, if the value of the reset request duration count is greater than one or more predetermined thresholds, one or more predefined subsets of control parameters are reset with factory default values.

FIG. 3 is a block diagram of the example CPU/core 102 of FIG. 1, in accordance with an embodiment of the disclosure. As seen in FIG. 3, in an example embodiment CPU/core 102 includes a CPU controller 302, a boot sequence unit 304, one or more core hardware units 308, and a crossbar interface 310.

In accordance with an embodiment, CPU controller 302 maintains a set of static and/or dynamically updated control parameters retrieved from non-volatile memory and stored and maintained in readily accessible volatile memory and that controls operation of the device in which the CPU/core 102 is included via executable instructions, also retrieved from non-volatile memory and executed in readily accessible volatile memory. In the example seen in FIG. 3, CPU controller 302 receives assistance from one or more special-function core hardware units 308, and a set of intellectual property plug-in modules (not seen) that CPU controller 302 communicates with via crossbar bus interface 310, as described in greater detail below.

In accordance with an embodiment, boot sequence unit 304 includes a set of executable instructions that CPU controller 302 is configured to execute as part of a boot process associated with a power-up or a system reset. For example, in an embodiment, upon receiving power, CPU controller 302 is preconfigured to execute a set of boot executable instructions located at a specified boot memory address. The boot sequence includes, for example, executable instructions associated with the initialization of control parameters, establishing communication paths between the CPU controller 302 and hardware/software modules with which the CPU controller will communicate, and the establishment of dynamic memory structures that are stored in volatile memory and that are subsequently used by CPU controller 302.

In accordance with an embodiment, core hardware units 308 include, for example, a set of one or more hardware based processing units that are tightly integrated with the CPU processor, or CPU controller 302, and are an integral part of CPU/core 102. Some core hardware units 308 provide CPU controller 302 with special processing capabilities and/or are invoked by CPU controller 302 to offload operations, e.g., numerical processing, switching/routing operations based routing tables and/or communication links defined in memory, etc., that cannot be efficiently performed by CPU controller 302 without interfering with command and control operations assigned to CPU controller 302. Other core hardware units 308 provide CPU controller 302 with special hardware resources, such as a cache of content addressable memory, or other hardware based resource. A decision for a hardware support capability to be provided by a core hardware unit that is integrated with the CPU/core 102, rather than providing the hardware support capability with an IP plug-in module that CPU controller 302 communicates with via crossbar bus interface 310, is based on a number of factors such as a required round-trip processing speed in response to a request from the CPU controller 302, the amount of traffic expected between the potential core hardware unit and the CPU controller 302 and the amount of traffic expected between other core hardware units which, based on similar considerations, have been included as part of the CPU/core 102. Components which would tend to dominate traffic across the crossbar bus interface traffic at the expense of the efficient execution of operations performed other crossbar bus connected hardware components are included as part of CPU/core 102. Further, highly specialized hardware based capabilities that are not used by a wide range of devices, and for which it is not therefore cost effective to design a version of the hardware component capable of communicating over the crossbar bus, are also be included as part of CPU/core 102.

In accordance with an embodiment, crossbar bus interface 310 provides CPU controller 302 with high speed communications with additional hardware units, such as PCI Express bus unit 110 that supports connectivity with SATA based peripherals, and a local device input/output unit 112 that supports interfaces with local devices as a display screen, keyboard, and pointing device, described above with respect to FIG. 1, that are not included as part of the CPU/core 102, and whose functional capability is well supported by, for example, an existing IP module that communicates with CPU/core 102 via an open standard crossbar bus interface. As described with respect to FIG. 1, the additional support units included in system on a chip 100 vary depending on the capabilities required by the device in which system on a chip 100 is installed. In this manner, the system on a chip approach provides device designers with the ability to efficiently produce highly reliable and capable devices in less time and with reduced development costs.

Figure 4:
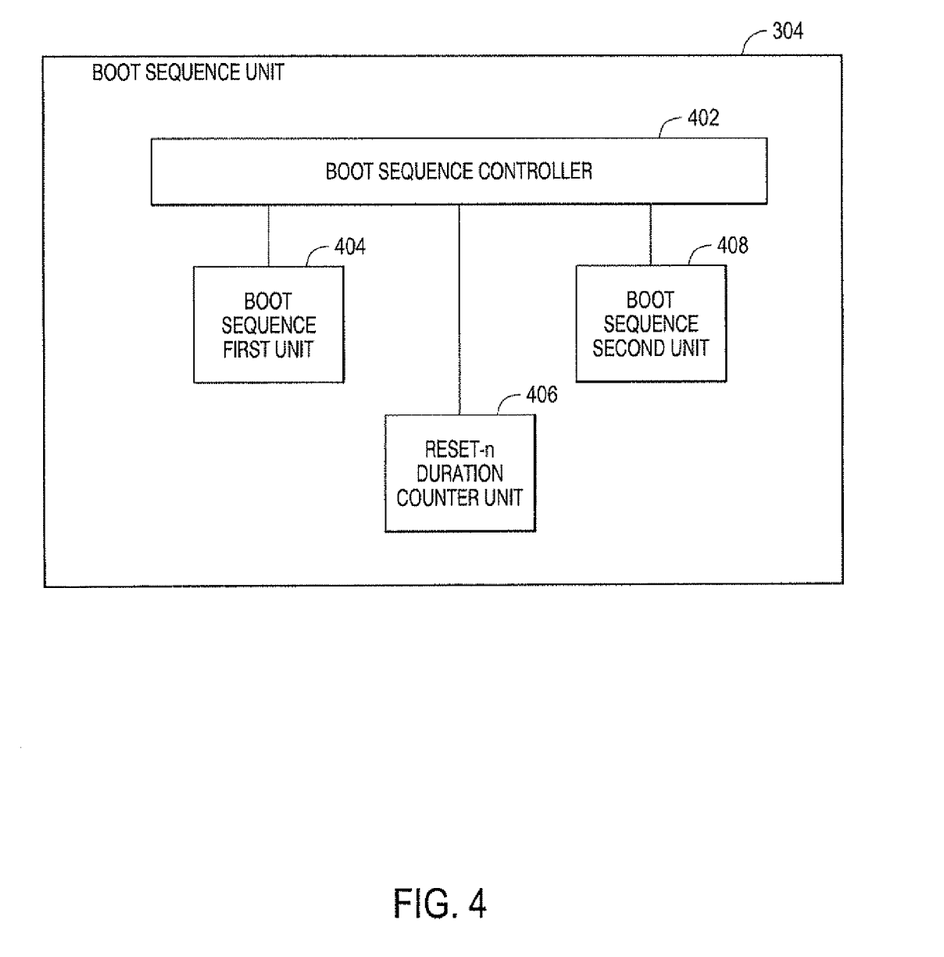
FIG. 4 is a block diagram of the example boot sequence unit of FIG. 3.

FIG. 4 is a block diagram of the example boot sequence unit 304 of FIG. 3. As described above with respect to FIG. 3, boot sequence unit 304 includes a set of executable instructions that CPU controller 302 is configured to execute as part of a boot process associated with a power-up or a system reset. In an embodiment, the boot sequence includes executable instructions associated with the initialization of control parameters, establishing communication paths between the CPU controller 302 and hardware/software modules with which the CPU controller will communicate, and the establishment of dynamic memory structures in volatile memory that are subsequently used by CPU controller 302. As further seen in FIG. 4, an example embodiment of boot sequence unit 304 includes a boot sequence controller 402, a boot sequence first unit 404, a boot sequence reset-n duration counter unit 406 and a boot sequence second unit 408.

Boot sequence controller 402 is initiated by CPU controller 302 to control execution of the CPU/core boot sequence. In one example embodiment, CPU controller 302 initiates a boot sequence first unit 404 that performs an initial boot sequence. One of the functions performed by boot sequence first unit 404 is to initialize the CPU/core to the point where CPU/core is capable of communicating with reset-n module 104 to retrieve the reset request duration count value stored in reset-n register 202, as described above with respect to FIG. 1 and FIG. 2.

Once the initial boot sequence performed by boot sequence first unit 404 is completed, CPU controller 302 invokes boot sequence reset-n duration counter I/F unit 406, which may be referred to as a factory reset module, to communicate with interface module 208 of reset-n module 104, to retrieve the reset request duration count stored in reset-n register 202. Once the reset request duration count is retrieved, boot sequence reset-n duration counter I/F unit 406 executes, as determined by the value of the retrieved reset request duration count, one or more routines to load one or more selected sets of command/control parameters and executable instructions from non-volatile memory to volatile memory for active use by boot sequence unit 304.

Once the boot sequence reset-n duration counter I/F unit 406 has retrieved and configured the control parameters and executable instructions, in an embodiment, CPU controller 302 invokes boot sequence second unit 408 to execute the remaining original boot code configured with the retrieved boot level control parameters, and/or to execute substitute or additional boot code, thereby completing the boot process.

Figure 5:
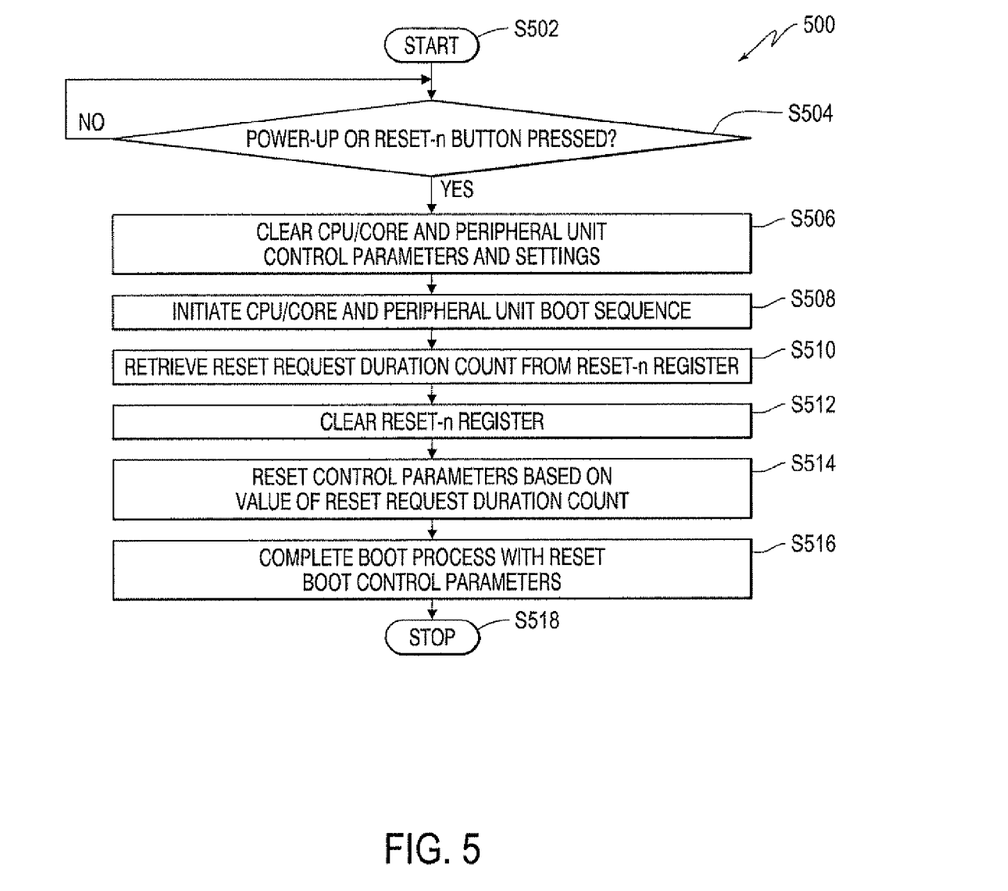
FIG. 5 is a flow-chart of an example CPU/core reset process flow that performs a CPU/core reset based on control parameters that are selectively reset based on a reset request duration count retrieved from a reset-n request register maintained by the reset-n module of FIG. 2.
Figure 6:
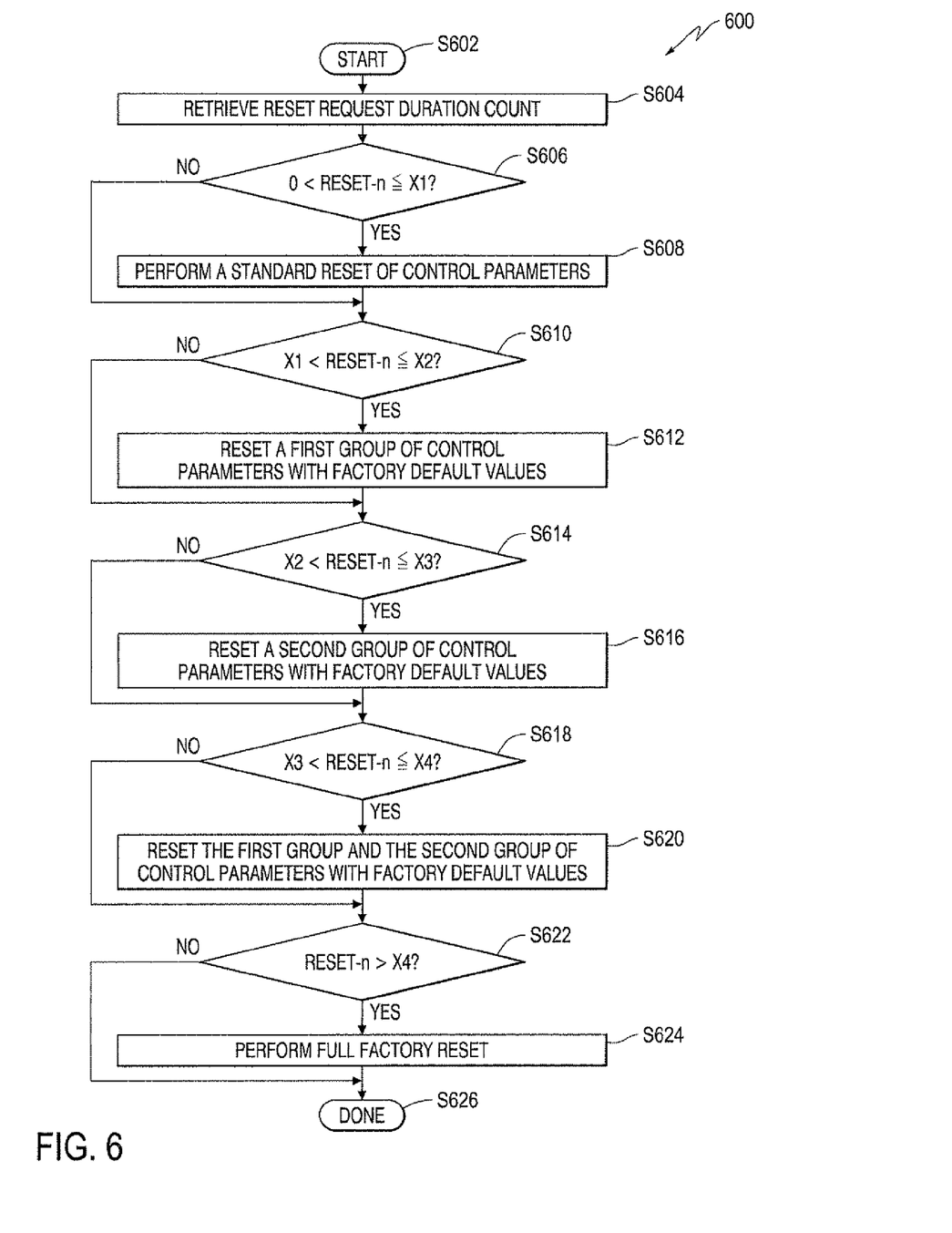
FIG. 6 is a flow-chart of an example process flow executed by a CPU during the CPU/core reset process flow of FIG. 5, to reset selected control parameters based on the reset request duration count retrieved from the reset-n request register.

FIG. 5 and FIG. 6 provide an example of a CPU/core reset process flow that performs a CPU/core reset based on control parameters that are selectively updated based on a reset request duration count retrieved from reset-n register 202, described above with respect to FIG. 2. Although the process described below with respect to FIG. 5 remains the same regardless of the type of reset requested, the control parameters that are reset at S514 in FIG. 5 vary depending on the value of the reset request duration count retrieved at S510 in FIG. 5. An example control parameter reset process performed at S514 in FIG. 5 is described below with respect to FIG. 6. As seen in FIG. 5, operation of process 500 begins at S502 and proceeds to S504.

At S504, if CPU controller 302 determines that a user has requested a reset, e.g., based on a voltage applied to the CPU/core reset control line by reset-n module 104 based on a state of reset request switch 114, operation of the process continues at S506; otherwise, operation of the process continues at S504.

At S506, CPU controller 302 clears all CPU/core and peripheral unit control parameters and settings, and operation of the process continues at S508.

At S508, CPU controller 302 invokes boot sequence controller 402, which invokes boot sequence first unit 404, to initiate a boot sequence to restart the CPU/core and related peripheral components, and operation of the process continues at S510.

At S510, boot sequence controller 402 invokes reset-n duration counter unit 406 to retrieve the reset request duration count maintained by reset-n module 104, e.g., in reset-n register 202, and operation of the process continues at S512.

At S512, reset-n duration counter unit 406 instructs reset-n module 104 to reset the reset request duration count, and operation of the process continues at S514.

At S514, reset-n duration counter unit 406 resets one or more sets of control parameters with factory reset values based on the value of the reset request duration count returned by reset-n duration counter unit 406 as described below with respect to FIG. 6, and operation of the process continues at S516.

At S516, boot sequence second unit 408 completes the boot sequence based on the control parameters values that have been reset based on the reset request duration count value, and operation of the process terminates at S518.

FIG. 6 is a flow-chart of an example process flow executed by a CPU during the CPU/core reset process flow of FIG. 5, to reset selected control parameters based on the reset request duration count value retrieved from the reset-n register 202. For example, in accordance with an embodiment, the process flow described with respect to FIG. 6 is performed by the reset-n duration counter unit 406 under the control of the boot sequence controller 402 as described in the process flow described above with respect to FIG. 5 at S514. As seen in FIG. 6, operation of process 600 begins at S602 and proceeds to S604.

At S604, reset-n duration counter unit 406 retrieves a reset request duration count from reset-n module 104, and operation of the process continues at S606.

At S606, if reset-n duration counter unit 406 determines that the reset request duration count value is greater than 0, but less than or equal to a predetermined first threshold value, X1, operation of the process continues at S608; otherwise, operation of the process continues at S610.

At S608, reset-n duration counter unit 406 performs a standard reset in which control parameters are reset based on values stored in non-volatile memory, but are not reset with factory default parameters, and operation of the process continues at S610.

At S610, if reset-n duration counter unit 406 determines that the reset request duration count value is greater than threshold X1, but less than or equal to a predetermined second threshold value, X2, operation of the process continues at S612; otherwise, operation of the process continues at S614.

At S612, reset-n duration counter unit 406 performs a predetermined routine that is associated with the determined value range of the reset request duration count value determined at S610, for example, a routine that resets a first subset of control parameters with factory default values stored in non-volatile memory and resets the remaining control parameter with non-factory default values stored in non-volatile memory, and operation of the process continues at S614.

At S614, if reset-n duration counter unit 406 determines that the reset request duration count value is greater than threshold X2, but less than or equal to a predetermined third threshold value, X3, operation of the process continues at S616; otherwise, operation of the process continues at S618.

At S616, reset-n duration counter unit 406 performs a predetermined routine that is associated with the determined value range of the reset request duration count value determined at S614, for example, a routine that resets a second subset of control parameters that is different from the first subset described above at S612, with factory default values stored in non-volatile memory and resets the remaining control parameter with non-factory default values stored in non-volatile memory, and operation of the process continues at S618.

At S618, if reset-n duration counter unit 406 determines that the reset request duration count value is greater than threshold X3, but less than or equal to a predetermined fourth threshold value, X4, operation of the process continues at S620; otherwise, operation of the process continues at S622.

At S620, reset-n duration counter unit 406 performs a predetermined routine that is associated with the determined value range of the reset request duration count value determined at S618, for example, a routine that resets the first subset of control parameters and the second subset of control parameters with factory default values stored in non-volatile memory and resets the remaining control parameters with non-factory default values stored in non-volatile memory, and operation of the process continues at S622.

At S622, if reset-n duration counter unit 406 determines that the reset request duration count value is greater than a predetermined fourth threshold value, X4, operation of the process continues at S624; otherwise, operation of the process terminates at S626.

At S624, boot sequence controller 402 resets all the control parameters with factory default values stored in non-volatile memory, and operation of the process terminates at S626.

It is noted that in the process flow described above with respect to FIG. 6, the predetermined routines executed at S612, 5616 and 5620, respectively, are stored, in memory that is accessible to CPU/core 102, such as a memory on the SoC, or a memory that is associated with the SoC.

Figure 7:
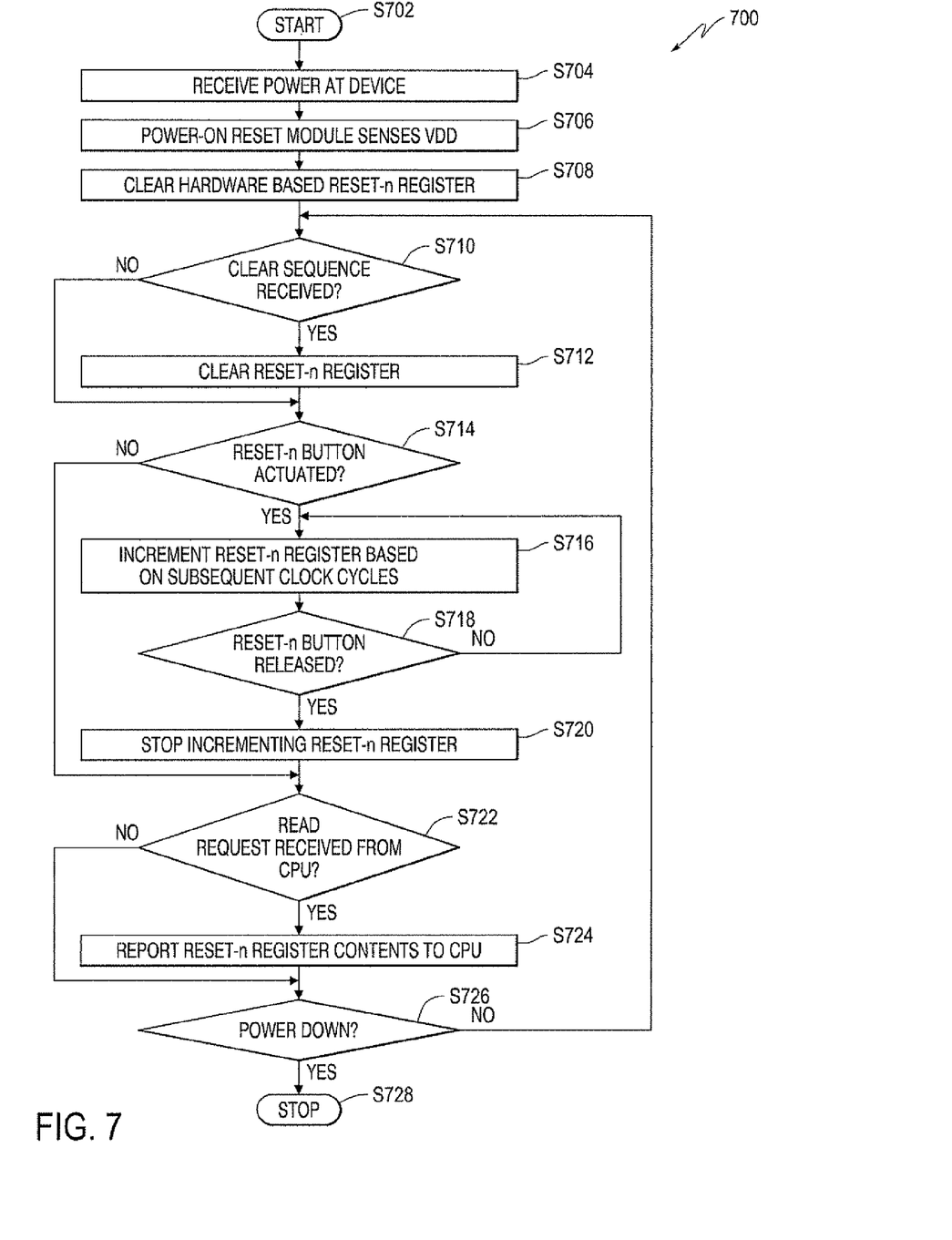
FIG. 7 is a flow-chart of an example process flow performed by the example reset-n module of FIG. 2.

FIG. 7 is a flow-chart of an example process flow that is used to control operation of reset-n module 104, described above with respect to FIG. 1 and FIG. 2, in accordance with an embodiment of the disclosure. As seen in FIG. 7, operation of process 700 begins at S702 and proceeds to S704.

At S704, the device in which reset-n module 104 is included receives power, e.g., from a battery or from an external source, and operation of the process continues at S706.

At S706, power-on reset module 204 senses a predetermined voltage level, e.g., VDD, and operation of the process continues at S708.

At S708, power-on reset module 204 clears the contents of non-volatile reset-n register 202, and operation of the process continues at S710.

At S710, if interface module 208 receives a clear sequence from boot sequence unit 304, as described above with respect to FIG. 3, operation of the process continues at S712; otherwise, operation of the process continues at S714.

At S712, interface module 208 clears the contents of non-volatile reset-n register 202, and operation of the process continues at S714.

At S714, if clock cycle counter module 206 determines that reset-n switch 114 is actuated, e.g., is being depressed by a user, operation of the process continues at S716; otherwise, operation of the process continues at S722.

At S716, upon receipt of each subsequent clock cycle pulse, clock cycle counter module 206 increments the reset request duration count stored in reset-n register 202, and operation of the process continues at S718.

At S718, if clock cycle counter module 206 determines that reset-n switch 114 is no longer actuated, e.g., is no longer being depressed by a user, operation of the process continues at S720; otherwise, operation of the process continues at S716.

At S720, clock cycle counter module 206 stops incrementing the reset request duration count stored in reset-n register 202, and operation of the process continues at S722.

At S722, if interface module 208 receives a read request from boot sequence unit 304, as described above with respect to FIG. 3, operation of the process continues at S724; otherwise, operation of the process continues at S726.

At S724, interface module 208 reports the contents of reset-n register 202 to boot sequence unit 304 of CPU/core 102, and operation of the process continues at S726.

At S726, if a loss of device power occurs, operation of the process terminates at S728; otherwise, operation of the process continues at S710.

It is noted that at S714 in the above-described process flow a reset request is detected based on the actuation of an electromechanical reset-n button, e.g., reset request switch 114 as seen in the example embodiment described with respect to FIG. 1, that activates the reset-n duration counter of reset-n module 104 and changes a voltage applied to the CPU/core reset control line between CPU/core 102 and reset-n module 104, as described above with respect to FIG. 1. However, embodiments that allow a reset request to be initiated by actuation of an electromechanical reset request switch, may also be configured to allow a reset request to be initiated by either an electromechanical reset request switch or an electronically actuated reset request switch. In such embodiments, a normal reset or factory reset may be initiated based on either physical actuation of an electromechanical reset request switch or based on executable instructions, e.g., user initiated executable instructions, i.e., software or firmware, that actuate an electronically actuated reset request switch for a pre-selected period of time that corresponds to a desired level of reset. In such embodiments, reset-n module 114, as described above with respect to FIG. 1, responds to a software initiated reset request in the same manner as described above with respect to FIG. 7 for an electromechanically initiated reset request.

For purposes of explanation in the above description, numerous specific details are set forth in order to provide a thorough understanding of the described hardware based detection mechanism for detecting a CPU reset requests. It is noted, however, that the described embodiments may be practiced without these specific details. In other instances, various structures and devices are omitted from the figures, or are depicted in simplified block diagram form, in order to avoid obscuring the teaching features of the described embodiments.

While the hardware based detection mechanism for detecting a CPU reset requests has been described in conjunction with the specific embodiments thereof, it is evident that many alternatives, modifications, and variations will be apparent to those skilled in the art. Accordingly, the described embodiments, as set forth herein, are intended to be illustrative, not limiting. There are changes that may be made without departing from the spirit and scope of the invention.

What is claimed is:

1. An integrated circuit device, comprising:
a central processing unit (CPU) that is configured to perform a reset operation in response to detecting that a first signal is asserted at an input pin;
a counter circuit, configured to operate independently from the CPU and not to reset a count of the counter circuit upon the reset operation of the CPU, that is coupled to the input pin and that is configured to count clock cycles whenever the first signal is asserted on the input pin, and to update a count value stored in a factory reset register based on the counted clock cycles; and
a factory reset module, configured to operate independently from the CPU, that compares the stored count value to a threshold value, and that causes the CPU to perform a factory reset operation, that is different from the reset operation, in response to the stored count value meeting or exceeding the threshold.

2. The integrated circuit device of claim 1, further comprising:
a hardware counter on an integrated circuit including the CPU, the hardware counter configured to count clock cycles during which the first signal is asserted on the input pin.

3. The integrated circuit device of claim 2, wherein each incremental clock cycle count is stored to a factory reset counter register.

4. The integrated circuit device of claim 1, wherein the factory reset module is further configured to set a pre-selected set of control parameters to a factory default value.

5. The integrated circuit device of claim 1, the counter circuit further comprising:
a power-on reset module that resets the factory reset register to zero upon first detecting that power has been supplied to the integrated circuit device.

6. The integrated circuit device of claim 1, the CPU further comprising:
a boot sequence unit that retrieves the count value from the factory reset register during a boot process and resets one or more control parameters with a factory default value based on the retrieved count value.

7. The integrated circuit device of claim 1, further comprising:
a mechanically actuated reset switch mechanical actuation of which asserts the first signal at the input pin.

8. The integrated circuit device of claim 1, further comprising:
an electronically actuated reset switch actuation of which by an executable instruction asserts the first signal at the input pin.

9. A method of controlling a reset of an integrated circuit device that includes a central processing unit (CPU), the method comprising:
counting a number of clock cycles occurring when a reset request is asserted to request a CPU reset, said clock cycles being counted using a hardware circuit counter that is operated separately from the CPU, wherein the counting of the hardware circuit counter is not reset by the CPU reset;
updating a clock cycle count value in a factory reset register in response to the counted clock cycles;

retrieving the clock cycle count value from the factory reset register after the CPU reset;

selectively reloading, by a factory reset module that is operated separately from the CPU, control parameters used to control operation of the integrated circuit device based on the clock cycle count value.

10. A method of claim 9, wherein said counting of the number of clock cycles is not affected by the CPU reset.

11. The method of claim 9, wherein the clock cycle count value stored in the factory reset register is incremented with each clock cycle.

12. The method of claim 9, further comprising:
resetting the count value stored in the factory reset register after retrieving the count value.

13. The method of claim 9, further comprising:
resetting the factory reset register to zero upon first detecting that power has been supplied to the integrated circuit device.

14. The method of claim 9, further comprising:
selectively reloading control parameters with factory default values based on the clock cycle count value.

15. The method of claim 9, wherein the reset request is asserted with a mechanically actuated reset request switch.

16. The method of claim 9, wherein the reset request is asserted with an electronically actuated reset switch that is actuated by an executable instruction.

17. A system on a chip that includes an integrated circuit device, integrated circuit device comprising:
a central processing unit (CPU) that is configured to perform a reset operation in response to detecting that a first signal is asserted at a input pin of the system on chip;
a counter circuit, configured to operate independently from the CPU and not to reset a count of the counter circuit upon the reset operation of the CPU, that is coupled to the input pin and that is configured to count clock cycles whenever the first signal is asserted on the input pin, and to update a count value stored in a factory reset register based on the counted clock cycles; and
a factory reset module, configured to operate independently from the CPU, that compares the stored count value to a threshold value, and that causes the CPU to perform a factory reset operation, that is different from the reset operation, in response to the stored count value meeting or exceeding the threshold.

18. The system on a chip of claim 17, further comprising:
a hardware counter on an integrated circuit including the CPU, the hardware counter configured to count clock cycles during which the first signal is asserted on the input pin.

19. The system on a chip of claim 17, wherein the factory reset module is further configured to set a pre-selected set of control parameters to factory default values.

\* \* \* \* \*